Jan. 27, 1931.                V. MONROE                1,790,387
                             FISHING TOOL
                           Filed Feb. 9, 1927
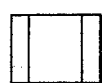
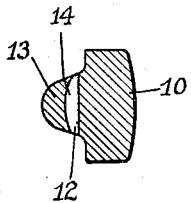
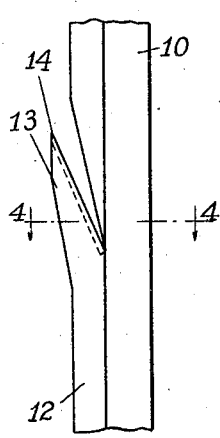
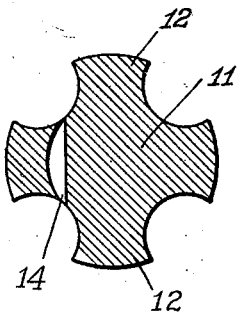
INVENTOR
Verne Monroe
By Green and McCollister
His attorneys Patented Jan. 27, 1931

1,790,387

UNITED STATES PATENT OFFICE

VERNE MONROE, OF CAMERON, WEST VIRGINIA

FISHING TOOL

Application filed February 9, 1927. Serial No. 166,995.

This invention relates to fishing tools and more particularly to the type known as rope spears, grabs, etc., such as are commonly employed in retrieving a lost rope or cable from a well hole.

As ordinarily constructed, tools of this type include one or more depending members having rope or cable piercing points known as wickers which are spaced longitudinally along the body of the tool so as to engage and bite into the lost rope or the like and bring it to the surface. In such arrangements the wickers are formed separately from the body of the grab or other tool and are mounted in position by a riveting or similar operation so that they are accordingly relatively easy to break off or injure. Then too, in the case of spears the body portion itself is frequently bent or broken when being driven into a coil of rope or cable as is sometimes necessary.

An object of this invention is to provide a device of the type described of novel and improved construction, together with a method of manufacturing the same.

A further object is to provide a fishing tool of the type set forth having features of construction which provide an unusually strong and rugged article without increasing the difficulty or cost of manufacture.

These and other objects which will be apparent to those skilled in this particular art are accomplished by means of the invention illustrated in the accompanying drawing, in which Figure 1 is an elevational view of one member of a rope grab constructed in accordance with one embodiment of this invention. Fig. 2 is a similar view taken from the side of Fig. 1. Fig. 3 is a view on an enlarged scale of a portion of Fig. 2. Fig. 4 is a transverse sectional view on the line 4—4 of Fig. 3. Fig. 5 is a view in elevation of a rope spear constructed in accordance with the same embodiment of this invention; and Fig. 6 is a transverse sectional view on the line 6—6 of Fig. 5.

In carrying out the illustrated embodiment of this invention, with the form of the grab illustrated in Figs. 1 to 4 or the rope spear illustrated in Figs. 5 and 6, the tool is forged with one or more longitudinally extending ribs on the surface to be provided with wickers. The wickers are formed by cutting the ribs at a downward angle and bending the partially cut portions outwardly, as shown, so as to form the necessary wickers.

As illustrated, the body of the grab 10 or spear 11 is provided with longitudinally extending ribs 12 which extend throughout the major portion of the tool body. The wickers 13 are formed by cutting or slicing the rib and bending the prong thus formed outwardly as illustrated.

In the case of the rope grabs 10 a single rib with a single line of wickers will be formed on each body portion, while the rope spears 11 may be provided with two or more ribs to form a plurality of rows of pointed wickers. The wickers are hollow or concave on the inside so as to form a knife-like edge 14 which will bite into the hard steel of a wire rope or cable and thus prevent it slipping backward into the well after it has once been engaged by the fishing tool.

As a result of the present invention the wickers can be provided in exactly the proper place on the tool and they can be positioned more closely together than has heretofore been possible, thus providing a larger number of wickers in a shorter space, resulting in a shorter and more rugged tool. Should a wicker become broken off or worn to such an extent that it will not bite or hold it can be renewed merely by slicing or cutting further into the rib. In addition, the presence of the longitudinal ribs 12 materially increases the strength of the tool so as to prevent bending or breaking thereof when it is necessary to drive it into and through the coil of the lost rope or cable.

Although I have described what I now consider to be the preferred embodiment of this invention it will be apparent that various changes, additions, substitutions and omissions can be made therein without departing from the spirit thereof or the scope of the appended claims. What I claim as new and desire to secure by Letter Patent is:

1. A well tool provided with a body portion having a longitudinally extending rib having struck up concave portions forming wickers.

2. A fishing tool for recovering ropes or cables from a well-hole, a forged rod-like body portion having a longitudinal rib formed thereon and wickers formed integrally on said rib, said wickers being spaced apart to form uncut portions between the wickers, each of said wickers extending upwardly and outwardly from said body, the upper surface of each wicker being formed by a downwardly extending cut in the rib extending approximately to the body portion or rod, whereby should any wicker be worn or broken it may be readily restored to its original size and effectiveness by extending the cut down the rib adjacent to the body portion or rod.

In testimony whereof, I have hereunto subscribed my name this 4th day of February, 1927.

VERNE MONROE.